United States Patent [19]

Stüwe

[11] Patent Number: 4,563,106
[45] Date of Patent: Jan. 7, 1986

[54] FRICTION-TRANSMITTING SHAFT/FLANGE CONNECTION

[75] Inventor: Hartwig Stüwe, Sprockhövel, Fed. Rep. of Germany

[73] Assignee: Stüwe GmbH & Co. KG, Hattingen, Fed. Rep. of Germany

[21] Appl. No.: 547,051

[22] Filed: Oct. 28, 1983

[51] Int. Cl.$^4$ ................................................ F16B 7/04
[52] U.S. Cl. .................................... 403/370; 403/371; 403/373; 474/903; 29/525
[58] Field of Search ............... 403/370, 371, 374, 368, 403/336, 369, 373; 29/525; 474/903

[56] References Cited

U.S. PATENT DOCUMENTS

| | | | |
|---|---|---|---|
| 1,371,212 | 3/1921 | Adams et al. | 403/370 X |
| 1,380,708 | 6/1921 | Ford | 403/370 X |
| 1,771,769 | 9/1930 | Brunner | 403/370 |
| 2,556,151 | 6/1951 | Bremer | 403/370 X |
| 2,998,731 | 9/1961 | Renner | 403/371 X |
| 3,972,636 | 8/1976 | Peter et al. | 403/370 X |
| 4,304,502 | 12/1981 | Stratienko | 403/370 |
| 4,425,816 | 1/1984 | Toyoda | 403/370 X |

FOREIGN PATENT DOCUMENTS

| | | | |
|---|---|---|---|
| 3223683 | 12/1983 | Fed. Rep. of Germany | 403/373 |
| 2235610 | 2/1972 | France | 403/370 |

Primary Examiner—Cornelius J. Husar
Assistant Examiner—Todd G. Williams
Attorney, Agent, or Firm—Michael J. Striker

[57] ABSTRACT

A friction-transmitting shaft/flange connection has a pressure ring arranged to be seated on a shaft and having a conical ascending surface, and a clamping ring having a pressing surface with which it is clamped on the ascending surface of the pressure ring and an end surface which is simultaneously connected with the flange in a friction transmitting manner.

6 Claims, 3 Drawing Figures

FRICTION-TRANSMITTING SHAFT/FLANGE CONNECTION

BACKGROUND OF THE INVENTION

The present invention relates to a friction-transmitting shaft/flange connection with a clamping ring having a conical pressing surface.

Friction-transmitting or friction-locking connections between shafts and flanges are known in different embodiments. The term "flange" is used here to determine machine elements which are to be connected to the shaft and extend substantially normal to the shaft axis. Such flanges are used in chain wheels, roller bodies, drum bodies of belt or bend reversing drums and the like.

U.S. Pat. 3,210,104 describes a friction-transmitting shaft/flange connection of the abovementioned type. For mounting a drum on a shaft, both bottoms of the drum are provided with axially extending hubs formed of one piece with the same and having outer conical ascending surfaces. The clamping ring with a conical pressing surface is pressed in an axial direction on the ascending surfaces of the hubs so strong that the radial forces produced by the conicity provide for a friction-transmitting or friction-locking connection between the outer surface of the shaft and the inner side of the hubs, satisfying the respective requirements. Since it is necessary to provide the drum bottoms with hubs, the drum is very expensive. When the drum bottoms are not provided with the respective hubs from the beginning they must be welded on the bottoms later on so that significant costs are involved. The clamping ring is pulled during fixing of the drum against the drum bottom (flange) by screws.

SUMMARY OF THE INVENTION

Accordingly, it is an object of the present invention to provide a friction-transmitting, shaft/flange connection of the abovementioned general type, which avoids the disadvantages of the prior art.

More particularly, it is an object of the present invention to provide a force-transmitting shaft/flange connection of the abovementioned general type, which guarantees a good connection of the flange with the shaft without arranging the hub on the flange.

In keeping with these objects and with others which will become apparent hereinafter, one feature of the present invention resides, briefly stated, in a force-transmitting shaft/flange connection in which a pressure ring is provided with a conical ascending surface, and clamping ring has a pressing surface which is clamped on the ascending surface of the pressure ring and also provided with an end surface with which it is simultaneously connected with the flange in a friction-transmitting manner.

When the connection is designed in accordance with the present invention, the force transmission takes place from the flange via the clamping ring and the pressure ring to the shaft and vice versa. Instead of the known fixed connection of the flange and the hub obtained for example by welding, there is now the friction-transmitting or friction-locking connection between the end surface of the clamping ring, the end surface facing toward the flange, and the flange itself. The entire arrangement is less expensive, inasmuch as the mounting of the hubs on the flange is dispensed with. Moreover, it is no longer necessary to fear loosening or opening of the screws serving for fixing the clamping ring, since the force transmission between the clamping ring and the flange takes place via the friction-transmitting connection between these both parts.

Friction-transmitting shaft/flange connections with a clamping ring are known in which no hubs are needed on the flange; however, the known connections have no suggestions for the inventive design of a shaft/flange connection. For example a so-alled "inwardly clamping" connection is known in which the connecting elements are provided between the shaft and the radially inner side of the flange, and a coupling of the both parts takes place in such a manner that the connection presses the flange radially outwardly. For accommodating the structural elements of the connection in the annular gap between the shaft and the flange and for guaranteeing that the flange will be able to take up the pressure forces, the flange must be considerably widened in the region facing toward the shaft. This is not only a very expensive feature to be taken into consideration, but also very disadvantageous since the flange in its region lying on the shaft has a very limited bending property. However, good bending property of the flange is desirable especially in the drum bottoms of belt or band drums. In the inventive shaft/flange connection this is guaranteed to full extent. In the inventive arrangement presumptions must be fulfilled that in the shaft in its region facing toward the flange, its surface that faces toward the clamping ring is smooth, so that a friction-transmitting connection with the clamping ring can be obtained.

In accordance with another feature of the present invention, the pressure ring is for example axially slotted so as to provide a good abutment of the pressure ring on the outer surface of the shaft.

A further advantageous feature of the present invention is that the pressure ring has a circumferential recess with a wall arranged so that the flange axially and radially abuts against the wall. In this embodiment, the inner diameter of the flange is significantly greater than the diameter of the shaft. During tightening the clamping ring by screws, the pressure ring because of its special design is also secured against displacement of the shaft, since it abuts against the flange. Simultaneously, the flange is centered by this recess.

It is also possible according to a further feature of the present invention to form the connection so that the pressure ring abuts with its end surface facing toward the flange, against the flange. Such a pressure ring can be produced simpler as compared with the above-described pressure ring. This pressure ring does not perform the function of centering of the flange. During tightening of the clamping ring it abuts axially against a flange so that it cannot slide during fixing of the connection.

When it is not necessary that the flange-facing end surface of the pressure ring abut against the flange in the clamped condition of the connection, it is preferable in accordance with still a further feature of the present invention, when the dimensions of the pressure ring and the clamping ring are selected so that their end surfaces facing toward the flange are in alignment with one another in the clamped condition of the clamping connection. This feature indicates in principle the same as the last described embodiment of the invention. However it goes further in that it provides a dimensioning rule for the formation of the pressure ring and clamping ring regardless of the cooperation with the flange.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
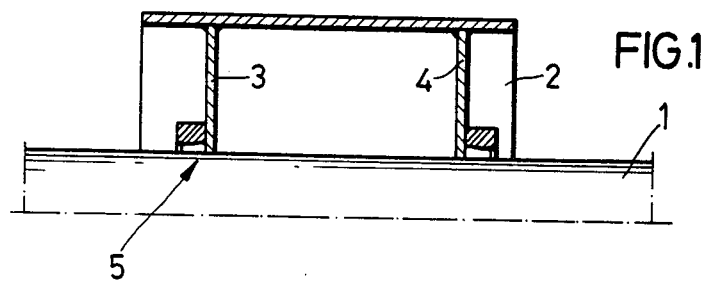
FIG. 1 is a view showing a longitudinal section of a belt drum mounted on a shaft in a friction-transmitting manner.

FIG. 1 shows a shaft 1 and a belt drum 2 mounted thereon. The belt drum 2 has two bottom identified with reference numerals 3 and 4 and referred to later on as flanges. A flange is mounted on the shaft by a friction-transmitting shaft/flange connection identified with reference numeral 5.

Figure 2:
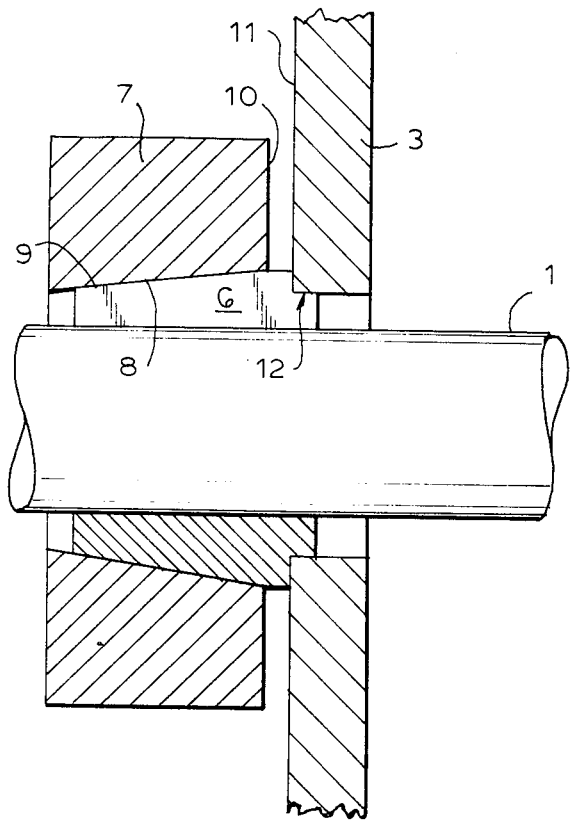
FIG. 2 is a view showing a section of the belt drum and the shaft of FIG. 1 with a force-transmitting shaft/flange connection according to the presend invention, in not-clamped condition, wherein the section is taken along a longitudinal slot of a longitudinally slotted pressure ring.

FIG. 2 shows the abovementioned friction-transmitting shaft/flange connection 5 for mounting the flange 3 on the shaft 1. It includes a pressure ring 6 with a conical ascending surface 9, and a clamping ring 7 with a conical pressure surface 8. The clamping ring 7 further has an end surface 10 facing toward the flange 3. During clamping of the friction-transmitting connection which is shown in FIG. 2 in unclamped condition, the end surface 10 of the clamping ring 7 comes to abutment against a surface 11 of the flange 3.

The pressure ring 6 has a recess 12 with one wall which faces toward the surface 11 of the flange 3 and another wall which faces toward the inner surface of the flange 3. The recess 12 is formed with the abovementioned walls so that the flange 3 sits in the recess 12.

For mounting the flange 3 on the shaft 1, the flange 3 and the clamping ring 7 are pulled toward one another with the aid of not shown screws, so that the clamping ring 7 with its pressing surface 8 displaces to the right on the ascending surface 9 of the pressure ring 6. The pressure ring 6 remains fixedly lying on the shaft, inasmuch as it abuts during pulling of the clamping ring 7 against the flange 3.

Figure 3:
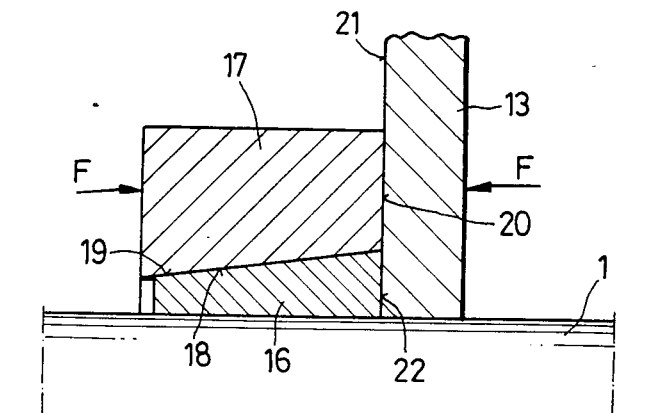
FIG. 3 is a view showing a section of a shaft/flange connection in accordance with another embodiment of the present invention, in clamped condition.

FIG. 3 shows a connection in accordance with the present invention in a clamped condition. This embodiment deviates from the embodiment of FIG. 2 in that a pressure ring 16 does not have a recess 12. Instead, the pressure ring 16 has an end surface 22 which faces toward a flange 13 and is smooth. The smooth end surface 22 abuts against the surface 21 of the flange 13. The flange 3 sits with a small play on the shaft 1. A clamping ring 17 with its pressing surface 18 is pulled with the force F identified by the arrow in FIG. 3 against an ascending surface 19 of the pressure ring 16. The clamping ring 17 has an end surface 20 which faces toward the flange 13 and is in a friction-transmitting connection with the surface 21 of the flange 13. As shown in the drawing, the end surface 20 of the clamping ring 17 and the end surface 22 of the pressure ring 17 which face toward the flange 13, are in alignment with one another.

The dimensions of the clamping ring and the pressure ring are selected so that the alignment of the end surfaces 20 and 22 during pulling of the clamping ring takes place when the required radial pressing force for pressing of the pressure ring against the shaft surface is reached. By applying a further force, for example, by additional screws between the flange and the clamping ring, the friction transmitting connection between the flange and the clamping ring is produced.

As can be easily seen from FIGS. 2 and 3, the pressing force required between the surfaces 11 and 10 or 21 and 20 is not so high as between the surfaces 8 and 9 or 18 and 19, since because of the greater distance of the clamping ring from the shaft axis, a favorable torque is generated.

The invention, of course, is not limited to the above described example. It can be used not only for the drum bottom in accordance with the abovementioned description but also basically for all parts to be connected with a shaft, as long as their planes extend substantially normal to the shaft axis. As further examples of use, chain wheels, roller bodies and the like can be named. It is also not absolutely necessary that the pressure ring be in contact with the flange. In accordance with other not completely favorable embodiments, the end side of the pressure ring which faces toward the flange can be arranged at a distance from the flange.

It will be understood that each of the elements described above, or two or more together, may also find a useful application in other types of constructions differing from the types described above.

While the invention has been illustrated and described as embodied in a friction-transmitting shaft/flange connection with a clamping ring having a conical pressing surface, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A friction-transmitting shaft/flange connection, comprising a pressure ring arranged to be seated on a shaft having an axis, said pressure ring having a conical ascending surface; and a clamping ring having a pressing surface with which it is clamped on said ascending surface of said pressure ring by displacing said clamping ring over said pressure ring in an axial direction toward the flange, said pressure ring having an end surface which is arranged to face toward the flange, and said clamping ring having an end surface arranged so that it is simultaneously engageable with a flange in a friction-transmitting manner.

2. A friction-transmitting shaft/flange connection as defined in claim 1, wherein said pressure ring is axially slotted.

3. A friction-transmitting shaft/flange connection, comprising a pressure ring arranged to be seated on a shaft having an axis, said pressure ring having a conical ascending surface; and a clamping ring having a pressure surface with which it is clamped on said ascending surface of said pressure ring by displacing said clamping ring over said pressure ring in an axial direction toward the flange, said clamping ring having an end surface arranged so that it is simultaneously engageable with a flange in a friction-transmitting manner, said pressing ring having a circumferential recess with a wall arranged so that the flange abuts axially and radially against said wall.

4. A friction-transmitting shaft/flange connection as defined in claim 3, wherein said wall of said recess has a substantially axially extending wall portion against which the flange abuts in a radial direction, and a substantially radially extending wall portion against which the flange abuts in an axial direction.

5. A friction-transmitting shaft/flange connection as defined in claim 1, wherein said end face of said pressure ring abuts against the flange in a clamped condition.

6. A friction-transmitting shaft/flange connection as defined in claim 1, wherein said pressure ring and said clamping ring have axial dimensions selected so that said end surface of said pressure ring and said end surface of said clamping ring are in alignment with one another in one radial plane in a clamped condition.

* * * * *